(12) United States Patent
Krog

(10) Patent No.: US 6,994,905 B2
(45) Date of Patent: Feb. 7, 2006

(54) SEALANT COATING FOR STUCCO AND METHOD OF PRODUCTION THEREOF

(75) Inventor: H. Dale Krog, Scottsdale, AZ (US)

(73) Assignee: Sunlife, Inc., Phoenix, AZ (US)

(*) Notice: Subject to any disclaimer, the term of this patent is extended or adjusted under 35 U.S.C. 154(b) by 305 days.

(21) Appl. No.: 10/602,270

(22) Filed: Jun. 23, 2003

(65) Prior Publication Data
US 2004/0259981 A1 Dec. 23, 2004

(51) Int. Cl.
*B32B 13/12* (2006.01)
(52) U.S. Cl. ............... 428/313.5; 428/402; 428/313.3; 428/313.7; 427/407.1; 523/218
(58) Field of Classification Search ............... 428/447, 428/448, 703; 427/407.1
See application file for complete search history.

(56) References Cited

U.S. PATENT DOCUMENTS

| 4,351,912 | A | | 9/1982 | Jasperson | |
|---|---|---|---|---|---|
| 5,356,716 | A | * | 10/1994 | Patel | .................. 428/423.1 |
| 5,548,018 | A | * | 8/1996 | Maekawa | .................. 524/517 |
| 5,576,065 | A | * | 11/1996 | Gaveske | .................. 427/407.1 |
| 6,033,736 | A | * | 3/2000 | Perlman et al. | ............. 427/384 |
| 6,516,580 | B1 | | 2/2003 | Maietta | |
| 2001/0056134 | A1 | | 12/2001 | Jesionka | |
| 2002/0054957 | A1 | | 5/2002 | Johnsen et al. | |
| 2002/0147267 | A1 | | 10/2002 | Magnet | |
| 2002/0151643 | A1 | | 10/2002 | Sarkar et al. | |
| 2003/0000424 | A1 | | 1/2003 | Naji et al. | |

* cited by examiner

Primary Examiner—David J. Buttner
(74) Attorney, Agent, or Firm—Jordan M. Meschkow; Lowell W. Gresham; Meschkow & Gresham, P.L.C.

(57) ABSTRACT

A method (200) and system (100) for the protection of stucco. A water-resistant preconditioner (102) is formulated. A substantially waterproof and breathable sealant coating (104 is formulated, and a water-resistant acrylic paint (106) is obtained. The preconditioner (102) is applied to a new stucco. The sealant coating (104) is applied to the stucco after the preconditioner (102). The acrylic paint (106) is applied to the stucco after the sealant coating (104). The preconditioner (102) contains water (114), a styrene acrylic primer (118), and a siliconate solution (120). The sealant coating (104) contains water (134), ceramic microspheres (152), polymeric microspheres (160), and a resin binder (166).

19 Claims, 3 Drawing Sheets

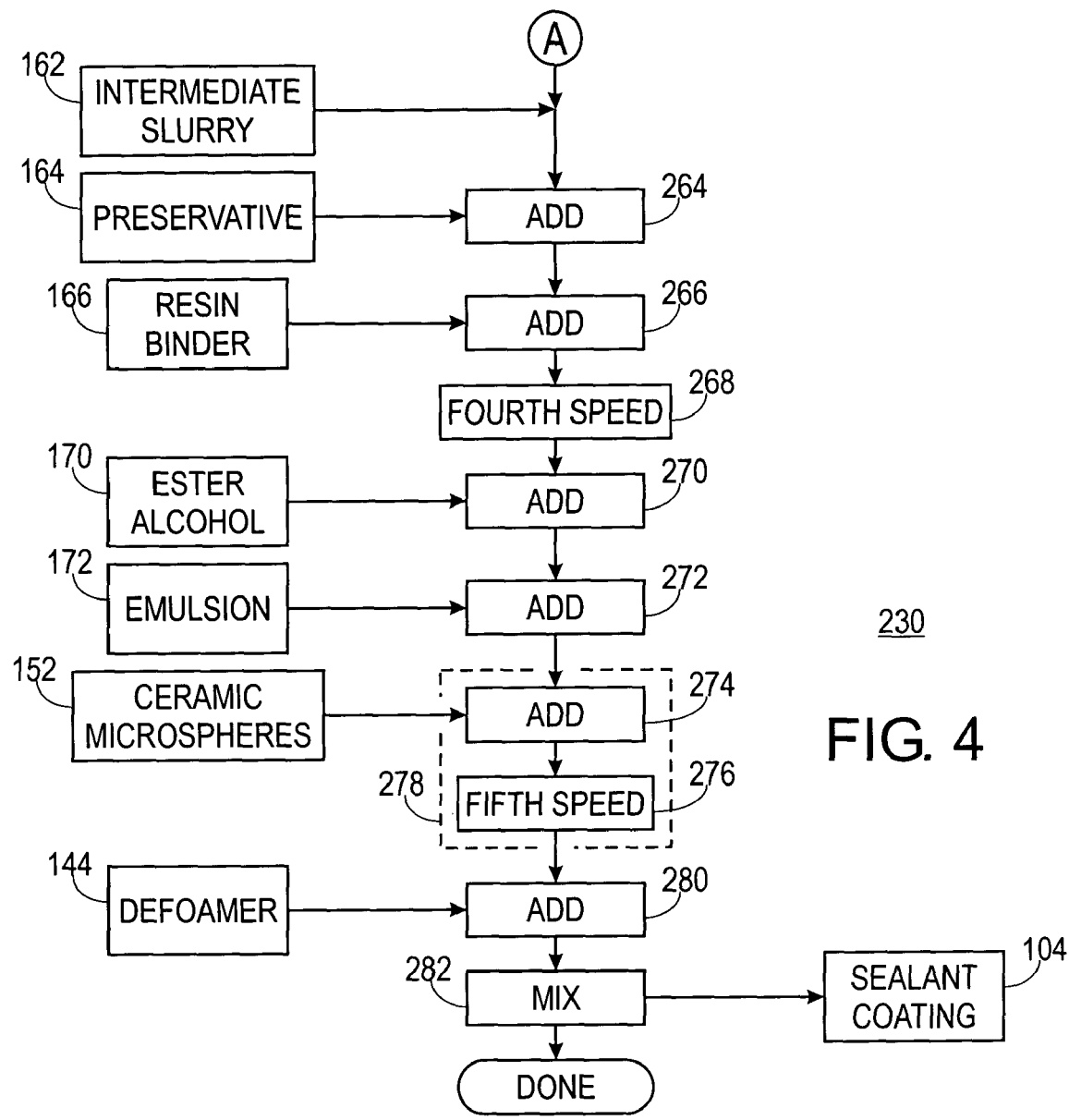

SEALANT COATING FOR STUCCO AND METHOD OF PRODUCTION THEREOF

TECHNICAL FIELD OF THE INVENTION

The present invention relates to the field of paints. More specifically, the present invention relates to the field of sealants and coatings for the protection of stucco.

BACKGROUND OF THE INVENTION

Being both inexpensive and reasonably stable, stucco is often employed in the construction industry for either a residential or a commercial building. Such stucco is especially popular in warm climates.

Stucco is often used with wood or metal framing. The resulting framed structure breathes, i.e. expands and contracts in response to daily thermal stresses. This breathing may result in the development of small cracks and other imperfections in the stucco.

Extreme weather conditions (e.g., a high summer heat coupled with a very low humidity, as found in the desert regions of the southwestern U.S.) may result in incomplete or irregular curing of stucco. Incomplete or irregular curing may in turn result in weak, cracked, and efflorescent stucco. For example, excessive heat and insufficient humidity may lead to the early release of water from newly applied stucco, resulting in incompletely hydrolized cement. The intrusion of water onto and into this incompletely hydrolized cement (e.g., from rain or sprinklers) can result in severe cracking and efflorescence.

It is a problem that standard architectural coatings generally cannot keep water from entering into stucco. Such coatings are therefore ineffective in protecting stucco against water intrusion and the resulting damage.

Elastomeric coatings have been used for some time to inhibit failures in stucco, and have been successful to a limited degree. A high-quality all-acrylic elastomeric coating will, when properly applied with an adequate film build, accomplish the task of protecting stucco from water intrusion. Unfortunately, the use of elastomeric coatings has several drawbacks.

The cost of materials for elastomeric coatings is three to four times the cost of a high-quality acrylic flat. Similarly, the cost of labor to apply elastomeric coatings is four to five times the cost of a standard paint job. This results in a tendency to perform an inadequate job of application by skimping on paint quality and/or coverage. This in turn results in failures ranging from cracking and efflorescing of the stucco to blistering of the elastomeric coating due to trapped moisture.

Additional problems exist in the repair of cracked stucco. Traditionally, such cracks are filled using an elastomeric caulk. The surface is then repainted. In many cases, the caulked crack is visible through the paint film. This results in a minimal improvement in appearance over the unrepaired cracks, and/or necessitates the application of a second coat of paint. The repair of stucco is therefore labor intensive and not always comprehensive.

SUMMARY OF THE INVENTION

Accordingly, it is an advantage of the present invention that a sealant coating, system, and method for the protection of stucco is provided.

It is another advantage of the present invention that a preconditioner for stucco is provided.

It is another advantage of the present invention that a sealant coating for stucco is provided that is waterproof and breathable.

The above and other advantages of the present invention are carried out in one form by a sealant coating to seal and coat stucco, where the sealant coating contains water, ceramic microspheres polymeric microspheres, and a resin binder.

The above and other advantages of the present invention are carried out in another form by a method for the production of a sealant coating for stucco, where the method involves charging a mixer with water, adding ceramic microspheres to the mixer, adding polymeric microspheres to the mixer, adding a resin binder to the mixer, and mixing the ingredients to produce the sealant coating.

The above and other advantages of the present invention are carried out in yet, another form by a system to seal and coat stucco, where the system incorporates a substantially waterproof and breathable sealant coating applied over the stucco, and a water-resistant acrylic paint applied over the stucco after application of the sealant coating.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a second part of a flowchart depicting a process for the formulation of a sealant coating in accordance with a preferred embodiment of the present invention.

DETAILED DESCRIPTION OF THE PREFERRED EMBODIMENTS

Figure 1:
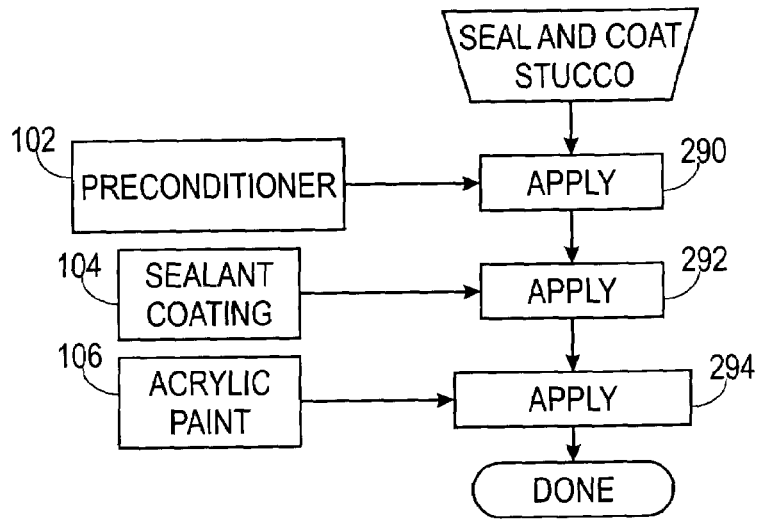
FIG. 1 shows a flowchart depicting a process for the protection of stucco in accordance with a preferred embodiment of the present invention.

FIG. 1 shows a flowchart depicting a process 200 for the protection of stucco in accordance with a preferred embodiment of the present invention.

A stucco protection system 100 consists of a preconditioner 102, a sealant coating 104, and an acrylic paint 106. Preconditioner 102 and sealant coating 104 are discussed in detail hereinafter. In the preferred embodiment, paint 106 is a water-repellent exterior flat acrylic paint. Those skilled in the art will appreciate that this is not a requirement of the present invention and another high-quality water-repellent exterior polymeric paint may be used without departing from the spirit of the present invention.

Stucco-protection process 200 consists of applying preconditioner 102, sealant coating 104, and paint 106 of system 100 to the stucco. Before preconditioner 102, sealant coating 104, and paint, 106 may be applied to the stucco, preconditioner 102, sealant coating 104 and paint 106 must be obtained. In the case of preconditioner 102 and sealant coating 104, this requires formulation.

Figure 2:
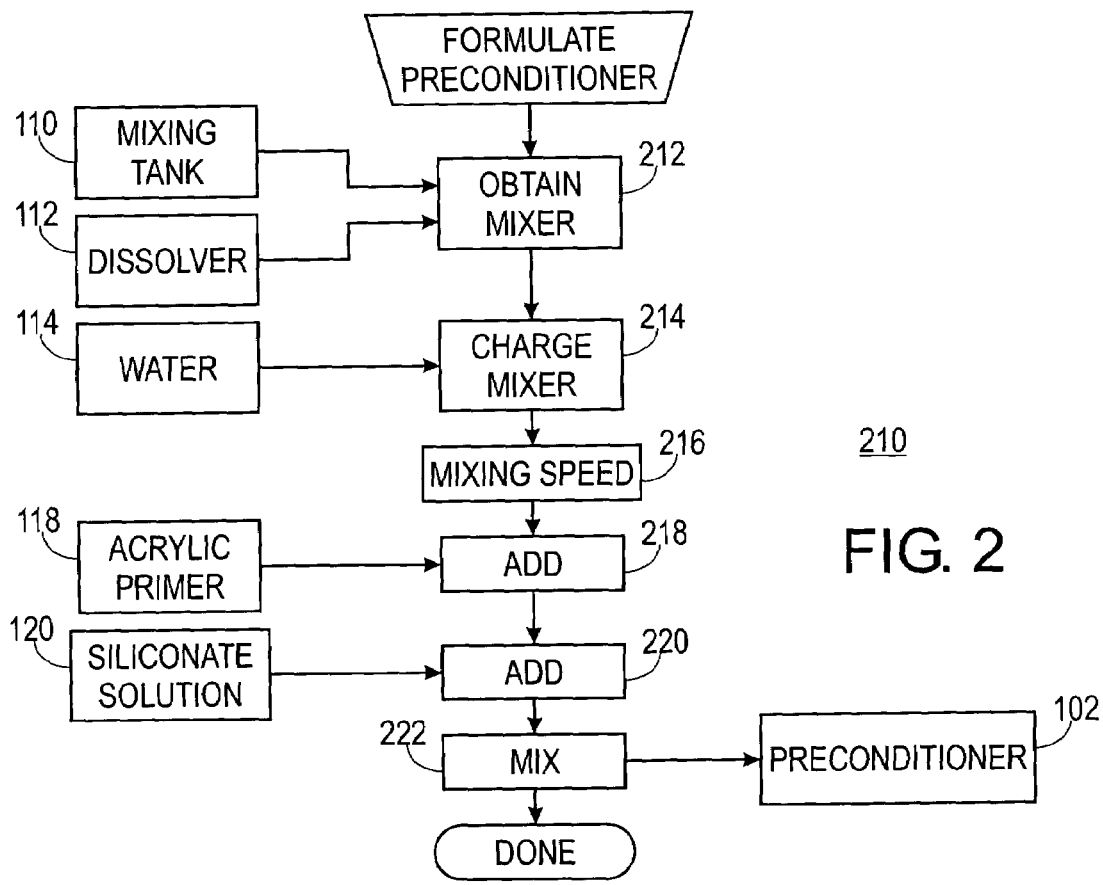
FIG. 2 shows a flowchart depicting a process for the formulation of a preconditioner in accordance with a preferred embodiment of the present invention.

FIG. 2 shows a flowchart depicting a process 210 for the formulation of preconditioned 102 in accordance with a preferred embodiment of the present invention. The following discussion refers to FIG. 2.

Preconditioner formulation process 210 formulates preconditioner 102. Those skilled in the art will appreciate that, in an exemplary embodiment formulated in the preferred manner, process 210 formulates a predetermined volume of preconditioner 102, where the predetermined volume constitutes 11 parts by volume of preconditioner 102. For convenience, the quantity of each of the components of preconditioner 102 is specified in terms of a number of parts by volume of the total volume of preconditioner 102. It will be appreciated that this is an exemplary embodiment only, and that variations in the volumes of preconditioner 102 and each of its components may be realized without departing from the spirit of the present invention.

In a task 212 of process 210, an empty mixer (not shown) is obtained. Throughout this discussion, the term "mixer" is used to mean the integration of an appropriate mixing tank 110 and an appropriate variable-speed dissolver 112. At any given time, the mixer may have contents, where the term "contents" is used to mean whatever has been placed into the mixer up to that point in time. An empty mixer is a mixer having no contents.

The mixer obtained in task 212 is made up of mixing tank 110 of an adequate size for the quantity of preconditioner 102 to be formulated, and a dissolver 112 of adequate horsepower. For example, if 200 gallons of preconditioner 102 is to be formulated, then mixing tank 110 may be a 250-gallon mixing tank and dissolver 112 may be a 50-hp dissolver. Those skilled in the art will appreciate that this is not a requirement of the present invention.

In a task 214 of process 210, the mixer is charged with water 114. In the exemplary embodiment, water 114 is approximately 5 parts by volume of preconditioner 102. Those skilled in the art will appreciate that variations in formulation may allow the quantity of water 114 to vary without departing from the spirit of the present invention.

In a task 216 of process 210, the mixer is set to operate at a desired mixing speed. Those skilled in the art will appreciate that the order of tasks 214 and 216 is not a requirement of the present invention, and that task 216 may be executed before task 214.

In a task 218 of process 210, an acrylic primer 118 is added to the mixer while operating at the desired mixing speed. Desirably, acrylic primer 118 is a styrene acrylic primer. In the exemplary embodiment, styrene acrylic primer 118 is approximately 5 parts by volume of preconditioner 102. Those skilled in the art will appreciate that variations in formulation may allow the quantity of acrylic primer 118 to vary without departing from the spirit of the present invention.

In a task 220 of process 210, a siliconate solution 120 is added to the mixer while operating at the desired mixing speed. Desirably, siliconate solution 120 is a sodium methyl siliconate solution. Siliconate solution 120 is a generic waterproofing agent, which binds with the cement of the stucco to inhibit efflorescence and cracking. In the exemplary embodiment, siliconate solution 120 is approximately 1 part by volume of preconditioner 102. Those skilled in the art will appreciate that variations in formulation may allow the quantity of siliconate solution 120 to vary without departing from the spirit of the present invention.

In a task 222 of process 210, the contents of the mixer (i.e., water 114, acrylic primer 118, and siliconate solution 120) are mixed to produce finished preconditioner 102. Preconditioner 102 is a water-resistant and breathable preconditioner suitable for use with stucco.

Figure 3:
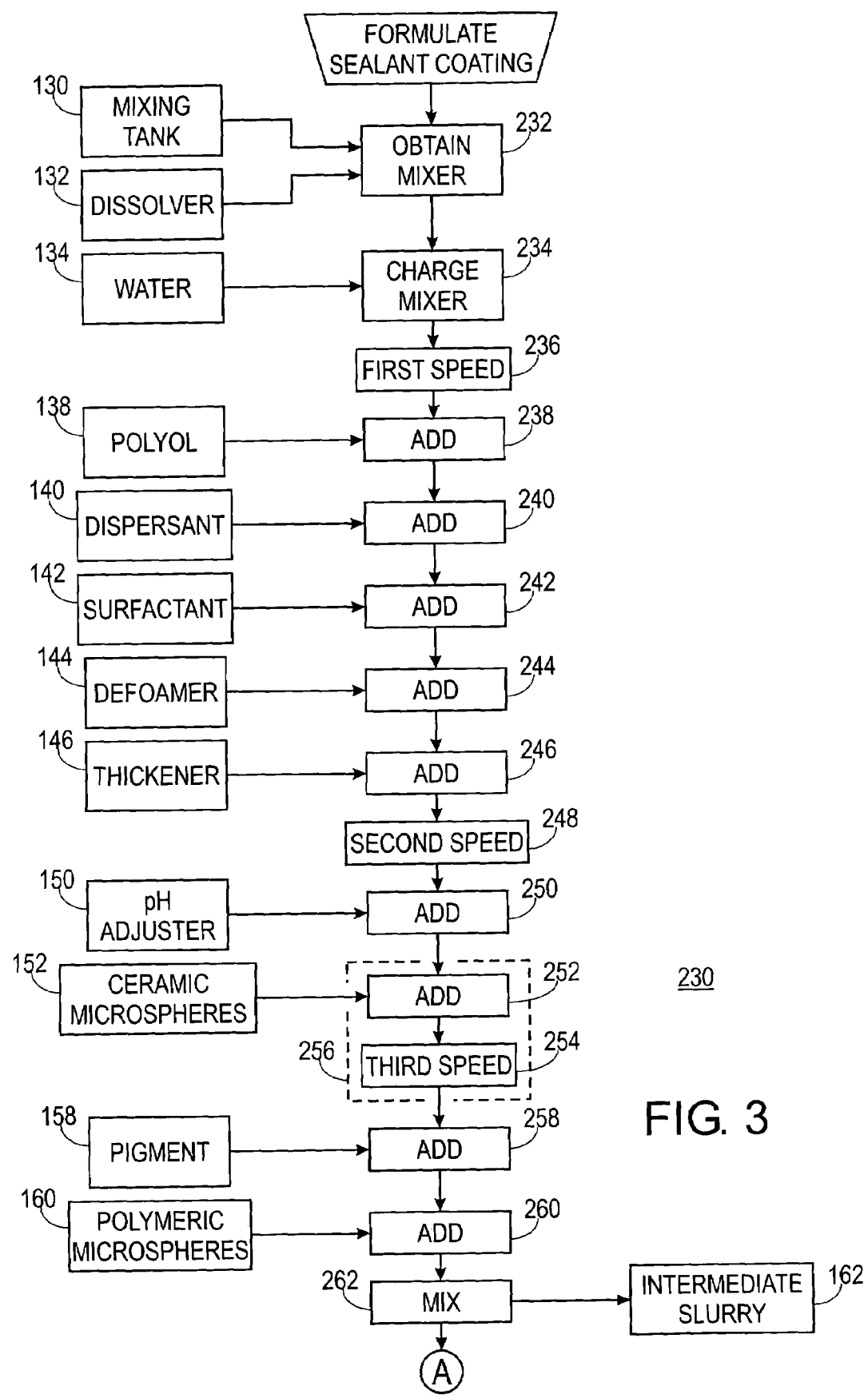
FIG. 3 shows a first part of a flowchart depicting a process for the formulation of a sealant coating in accordance with a preferred embodiment of the present invention.

FIGS. 3 and 4 together show a flowchart depicting a process 230 for the formulation of sealant coating 104 in accordance with a preferred embodiment of the present invention. The following discussion refers to FIGS. 1, 3, and 4.

Sealant coating formulation process 230 formulates sealant coating 104. Those skilled in the art will appreciate that, in an exemplary embodiment formulated in the preferred manner, process 230 formulates a predetermined mass of sealant coating 104, where the predetermined mass constitutes 100 percent of the mass of sealant coating 104. The components of sealant coating 104 may be either liquids or solids (powders). For convenience, the quantity of each of the components is specified in terms of a percentage of the total mass of sealant coating 104. It will be appreciated that this is an exemplary embodiment only, and that variations in the mass of sealant coating 104 and the mass percentage of each of its components may be realized without departing from the spirit of the present invention.

In a task 232 of process 230, an empty mixer (not shown) is obtained. The mixer is made up of a mixing tank 130 of an adequate size for the quantity of sealant coating 104 to be formulated, and a dissolver 132 of adequate horsepower. For example, if 200 gallons of sealant coating 104 is to be formulated, then mixing tank 130 may be a 250-gallon mixing tank and dissolver 132 may be a 50-hp dissolver. Those skilled in the art will appreciate that this is not a requirement of the present invention.

In a task 234 of process 230, the mixer is charged with water 134.

In the exemplary embodiment, water 134 constitutes approximately 8 percent of the mass of sealant coating 104 and establishes the "fluidity" of sealant coating 104. Those skilled in the art will appreciate that variations in formulation may allow the percentage of water 134 to vary (e.g., from 4 to 12 percent of the mass of sealant coating 104) without departing from the spirit of the present invention.

In a task 236 of process 230, the mixer is set to operate at a first mixing speed. In the exemplary embodiment, the first mixing speed is a "slow" speed of approximately 800 rpm. Since the mixer contains only water at this point, this slow mixing speed helps to eliminate excessive splashing. Those skilled in the art will appreciate that a first mixing speed of 800 rpm is not a requirement, and that another mixing speed may be used without departing from the spirit of the present invention.

Those skilled in the art will also appreciate that the order of tasks 234 and 236 is not a requirement of the present invention, and that task 236 may be executed before task 234.

In a task 238 of process 230, a polyol 138 is added to the mixer while operating at the first mixing speed. Polyol 138 serves to allow sealant coating to maintain a "wet edge" during application. This in turns allows for a more uniform application using conventional application techniques.

Desirably, polyol 138 is diethylene glycol. Those skilled in the art will appreciate that this is not a requirement of the present invention, and that other polyols, e.g., ethylene glycol and propylene glycol, may be used without departing from the spirit of the present invention.

In the exemplary embodiment, polyol 138 constitutes approximately 10 percent of the mass of sealant coating 104. Those skilled in the art will appreciate that variations in formulation may allow the percentage of polyol 138 to vary (e.g., from 5 to 15 percent of the mass of sealant coating 104) without departing from the spirit of the present invention.

In a task 240 of process 230, a dispersant 140 is added to the mixer while operating at the first mixing speed. Dispersant 140 serves to assure that substantially all the dry ingredients (e.g., pigments) of sealant coating 104 are dispersed uniformly throughout the liquid medium (e.g., water 134).

Desirably, dispersant 140 is an aqueous sodium polyacrylate solution, e.g., "Axiom 2005N" from Vining Industries, Inc. Those skilled in the art will appreciate that this is not a requirement of the present invention, and that other dispersants may be used without departing from the spirit of the present invention.

In the exemplary embodiment, dispersant 140 constitutes approximately 0.31 percent of the mass of sealant coating 104. Those skilled in the art will appreciate that variations in formulation may allow the percentage of dispersant 140 to vary (e.g., from 0.15 to 0.47 percent of the mass of sealant coating 104) without departing from the spirit of the present invention.

In a task 242 of process 230, a surfactant 142 is added to the mixer while operating at the first mixing speed. Surfactant 142 is desirably an active surface agent that serves to effectively prevent pigment reflocculation. In addition, surfactant 142 aids in color development should liquid colorants be added to finished sealant coating 104 prior to application.

Desirably, surfactant 142 is a benzyl ether of octyl phenolethylene oxide adduct, e.g., "Triton CF-10" from Dow Chemical Company. Those skilled in the art will appreciate that this is not a requirement of the present invention, and that other surfactants may be used without departing from the spirit of the present invention.

In the exemplary embodiment, surfactant 142, constitutes approximately 0.28 percent of the mass of sealant coating 104. Those skilled in the art will appreciate that variations in formulation may allow the percentage of surfactant 142 to vary (e.g., from 0.14 to 0.42 percent of the mass of sealant coating 104) without departing from the spirit of the present invention.

In a task 244 of process 230, a defoamer 144 is added to the mixer while operating at the first mixing speed. Defoamer 144 serves to inhibit the production of foam during process 230.

Desirably, defoamer 144 is a mixture of hydrophobic components in paraffin-based mineral oil, e.g., "Byk 035" from Byk-Chemie GmbH. Those skilled in the art will appreciate that this is not a requirement of the present invention, and that other defoamers may be used without departing from the spirit of the present invention.

In the exemplary embodiment, task 244 adds a first quantity of defoamer 144 to the mixer, where this first quantity constitutes approximately 0.96 percent of the mass of sealant coating 104. Those skilled in the art will appreciate that variations in formulation may allow the percentage of defoamer 144 in this first quantity to vary (e.g., from 0.48 to 1.44 percent of the mass of sealant coating 104) without departing from the spirit of the present invention.

In a task 246 of process 230, a thickener 146 is added to the mixer while operating at the first mixing speed. Thickener 146 serves to stabilize the viscosity of finished sealant coating 104. Most desirably, finished sealant coating 104 has a viscosity of 102 to 104 Kreb units, but this is not a requirement of the present invention.

Desirably, thickener 146 is a cellulosic thickener formed of ethyl hydroxyethyl cellulose, e.g., "Bermacoll EHM 200ED" from Akzo Nobel nv. Those skilled in the art will appreciate that this is not a requirement of the present invention, and that other thickeners may be used without departing from the spirit of the present invention.

In the exemplary embodiment, thickener 146 constitutes approximately 0.16 percent of the mass of sealant coating 104. Those skilled in the art will appreciate that variations in formulation may allow the percentage of thickener 146 to vary (e.g., from 0.08 to 0.24 percent of the mass of sealant coating 104) without departing from the spirit of the present invention.

In a task 248 of process 230, the mixer is adjusted from the first mixing speed to a second mixing speed greater than the first mixing speed. In the exemplary embodiment, the second mixing speed is a "medium" speed of approximately 1000 rpm. This medium mixing speed helps the now-thickened contents of the mixer to thoroughly mix without causing unnecessary foaming and splashing. Those skilled in the art will appreciate that a second mixing speed of 1000 rpm is not a requirement, and that another mixing speed may be used without departing from the spirit of the present invention.

In a task 250 of process 230, a pH adjuster 150 is added to the mixer while operating at the second mixing speed. pH adjuster 150 adjusts the pH of the contents of the mixer up to the range of 9.0 to 9.3. This higher pH helps to activate thickener 146 and serves to ensure the stability of finished sealant coating 104.

Desirably, pH adjuster 150 is an 85-percent solution of monoethanolamine, e.g., "M Amine" from several companies. Those skilled in the art will appreciate that this is not a requirement of the present invention, and that other pH adjusters, e.g., ammonia, may be used without departing from the spirit of the present invention.

In the exemplary embodiment, pH adjuster 150 constitutes approximately 0.25 percent of the mass of sealant coating 104. Those skilled in the art will appreciate that variations in formulation may allow the percentage of thickener 146 to vary (e.g., from 0.12 to 0.38 percent of the mass of sealant coating 104) without departing from the spirit of the present invention. Additionally, the use of another pH adjuster may require a different quantity of that pH adjuster in order achieve the desired pH adjustment.

In a task 252 of process 230, ceramic microspheres 152 are added to the mixer. Ceramic microspheres 152 serve to add bulk to sealant coating 104. This bulk aids in the filling of cracks and voids in the stucco. The ceramic microspheres 152 added in task 252 further serve as mixing agents. As mixing agents, ceramic microspheres 152 provide for a better dispersal of solids (specifically, a pigment 158 discussed hereinafter), throughout the contents of the mixer.

Desirably, ceramic microspheres 152 are hollow ceramic shells of great strength. By being strong, ceramic microspheres serve in sealant coating as a crush-resistant filler minimally affected by expansion and contraction of the stucco due to thermal and mechanical stresses. By being hollow, ceramic microspheres have a very light mass. This light mass serves to help ceramic microspheres to maintain a uniform dispersion throughout sealant coating during application by spraying or rolling.

Desirably, ceramic microspheres 152 are hollow ceramic shells having nominal diameters of 135 $\mu$m (i.e., from 120–150 $\mu$m) and nominal crush strengths of 2000 psi, e.g., "Zeeospheres G-3150" from 3M Company. Those skilled in the art will appreciate that this is not a requirement of the present invention, and that other ceramic microspheres, glass microspheres, or similar products may be used without departing from the spirit of the present invention.

In the exemplary embodiment, task 252 adds a first quantity of ceramic microspheres 152 to the mixer, where this first quantity constitutes approximately 13.35 percent of the mass of sealant coating 104. Those skilled in the art will appreciate that variations in formulation may allow the percentage of ceramic microspheres 152 in this first quantity to vary (e.g., from 6.6 to 20.1 percent of the mass of sealant coating 104) without departing from the spirit of the present invention.

In a task 254 of process 230, the mixer is adjusted from the second mixing speed to a third mixing speed greater than the second mixing speed. Task 254 is coincident with task 252. That is, at the beginning of task 252, the mixer is set to the second mixing speed. Throughout task 252, task 254 slowly adjusts the mixer from the second mixing speed to the third mixing speed. At the end of task 252, the mixer is set to the third mixing speed.

Because tasks 252 and 254 are performed substantially simultaneously, tasks 252 and 254 together form a hypertask (i.e., a task of tasks) 256.

In the exemplary embodiment, the third mixing speed is a "medium-high" speed of approximately 1200 rpm. This medium-high mixing speed serves to generate a vortex, which more thoroughly mixes the contents of the mixer and takes advantage of ceramic microspheres 152 as mixing agents. Those skilled in the art will appreciate that a third mixing speed of 1200 rpm is not a requirement, and that another mixing speed may be used without departing from the spirit of the present invention.

In a task 258 of process 230, pigment 158 is added to the mixer while operating at the third mixing speed. Pigment 158 serves to produce a brilliant white coloration of finished sealant coating 104. This white coloration in turn serves as a base, to which liquid colorants may be added to produce desired color for sealant coating 104.

Desirably, pigment 158 is a white hiding pigment primarily constituting titanium dioxide, e.g., "Rutile TiO2" from several companies. Those skilled in the art will appreciate that this is not a requirement of the present invention, and that another white hiding pigment may be used without departing from the spirit of the present invention.

In the exemplary embodiment, pigment 158 constitutes approximately 0.78 percent of the mass of sealant coating 104. Those skilled in the art will appreciate that variations in formulation may allow the percentage of pigment 158 to vary (e.g., from 0.39 to 1.17 percent of the mass of sealant coating 104) without departing from the spirit of the present invention.

In a task 260 of process 230, of polymeric microspheres 160 are added to the mixer while operating at the third mixing speed. Polymeric microspheres 160 serve as a deformable filler, which adds bulk and flexibility to sealant coating 104. As bulk, polymeric microspheres aid in the filling of cracks and voids in the stucco smaller than those fillable by ceramic microspheres 152. Since they are flexible, polymeric microspheres help to maintain the integrity of sealant coating 104 as the stucco expands and contracts due to thermal and mechanical stresses.

Desirably, polymeric microspheres 160 are hollow shells of vinylidene chloride and acrylonite having nominal diameters of 30–50 $\mu$m (i.e., from 20–60 $\mu$m), e.g., "Expancel 551 WE" from Akzo Nobel nv. Initially, polymeric microspheres 160 have a much smaller diameter and encapsulate isobutane as a blowing agent. When heated, polymeric microspheres expand to their nominal diameters as a result of internal gas pressure. During this process, the isobutane blowing agent is effectively dissipated. In the present invention, polymeric microspheres are used in their expanded form.

In the exemplary embodiment, polymeric microspheres 160 constitute approximately 6.00 percent of the mass of sealant coating 104. Those skilled in the art will appreciate that variations in formulation may allow the percentage of polymeric microspheres 160 to vary (e.g., from 3 to 9 percent of the mass of sealant coating 104) without departing from the spirit of the present invention.

In a task 262 of process 230, the contents of the mixer are mixed to produce an intermediate slurry 162 in which substantially all solids have been thoroughly dispersed. This dispersal is significantly aided by the presence of ceramic microspheres 152 in intermediate slurry 162.

In a task 264 of process 230, a preservative 164 is added to the mixer while operating at the third mixing speed. Preservative 164 is desirably an antimicrobial preservative, and serves to inhibit the growth of fungus in sealant coating 104.

Preferably, preservative 164 is a 40-percent solution of dimethyloldimethyldantoin, e.g., "Dantogard" from Lonza Group, Ltd. Those skilled in the art will appreciate that this is not a requirement of the present invention, and that another preservative may be used without departing from the spirit of the present invention.

In the exemplary embodiment, preservative 164 constitutes approximately 0.24 percent of the mass of sealant coating 104. Those skilled in the art will appreciate that variations in formulation may allow the percentage of preservative 164 to vary (e.g., from 0.12 to 0.36 percent of the mass of sealant coating 104) without departing from the spirit of the present invention.

In a task 266 of process 230, a resin binder 166 is added to the mixer while operating at the third mixing speed. Resin binder 166 serves to bind ceramic and polymeric microspheres 152 and 160, and other ingredients, to the stucco.

Desirably, resin binder 166 is an aqueous styrene acrylic copolymer emulsion have a small particle size, e.g., "Acronal 296D" from BASF Ag. Resin binder 166 is especially suited to exterior cementitious surfaces such as stucco. Resin binder 166 contains both styrene and acrylic monomers. The styrene monomers lend water and alkali resistance to the stucco. The acrylic monomers lend toughness and flexibility.

Desirably, resin binder 166 is a 50-percent solids (by weight) aqueous styrene acrylic copolymer emulsion. Those skilled in the art will appreciate that this is not a requirement of the present invention, and that another resin binder may be used without departing from the spirit of the present invention.

In the exemplary embodiment, resin binder 166 constitutes approximately 31.50 percent of the mass of sealant coating 104. Those skilled in the art will appreciate that variations in formulation may allow the percentage of resin binder 166 to vary (e.g., from 15 to 48 percent of the mass of sealant coating 104) without departing from the spirit of the present invention.

In a task 268 of process 230, the mixer is adjusted from the third mixing speed to a fourth mixing speed less than the third mixing speed. In the exemplary embodiment, the fourth mixing speed is substantially identical to the second mixing speed, and is a "medium" speed of approximately 1000 rpm. This medium mixing speed helps the contents of the mixer to thoroughly mix without causing unnecessary foaming and splashing. Those skilled in the art will appreciate that a second mixing speed of 1000 rpm is not a requirement, and that another mixing speed may be used without departing from the spirit of the present invention.

In a task 270 of process 230, an ester alcohol 170 is added to the mixer while operating at the fourth mixing speed. Ester alcohol 170 serves as a coalescent aid to ensure a uniform and complete film formation of resin binder 166.

Desirably, ester alcohol 170 is a 2,2,4-trimethyl-1,3-pentanediol monoisobutyrate, e.g., "Texanol" from Eastman Chemical Company. Those skilled in the art will appreciate that this is not a requirement of the present invention, and that another ester alcohol may be used without departing from the spirit of the present invention.

In the exemplary embodiment, ester alcohol 170 constitutes approximately 1.00 percent of the mass of sealant coating 104. Those skilled in the art will appreciate that variations in formulation may allow the percentage of ester alcohol 170 to vary (e.g., from 0.5 to 1.5 percent of the mass of sealant coating 104) without departing from the spirit of the present invention.

In a task 272 of process 230, an emulsion 172 is added to the mixer while operating at the fourth mixing speed. Emulsion 172 is configured to incorporate itself throughout the dried sealant coating 104 to aid in long-term water repellency. Emulsion 172 imparts water beading to sealant coating 104 and thereby reduces capillary water uptake. Capillary water uptake, if not inhibited, may lead to mildew contamination.

Desirably, emulsion 172 is an aqueous polysiloxane emulsion, e.g., "BS-1306" from Wacker-Chemie GmbH. Those skilled in the art will appreciate that this is not a requirement of the present invention, and that another emulsion may be used without departing from the spirit of the present invention.

In the exemplary embodiment, emulsion 172 constitutes approximately 0.50 percent of the mass of sealant coating 104. Those skilled in the art will appreciate that variations in formulation may allow the percentage of emulsion 172 to vary (e.g., from 0.25 to 0.75 percent of the mass of sealant coating 104) without departing from the spirit of the present invention.

In a task 274 of process 230, ceramic microspheres 152 (described hereinbefore in conjunction with task 252) are again added to the mixer.

In the exemplary embodiment, task 274 adds a second quantity of ceramic microspheres 152 to the mixer, where this second quantity constitutes approximately 26.36 percent of the mass of sealant coating 104. Those skilled in the art will appreciate that variations in formulation may allow the percentage of ceramic microspheres 152 in this second quantity to vary (e.g., from 13 to 40 percent of the mass of sealant coating 104), without departing from the spirit of the present invention.

Ceramic microspheres 152 are added to the mixer in tasks 252 and 274. In the exemplary embodiment, therefore, the first and second quantities of ceramic microspheres 152 collectively constitute approximately 39.71 percent of the mass of sealant coating 104. Those skilled in the art will appreciate that variations in formulation may allow the total percentage of ceramic microspheres 152 to vary (e.g., from 19 to 60 percent of the mass of sealant coating 104) without departing from the spirit of the present invention.

Additionally, it will be appreciated that the ratio of ceramic microspheres 152 added to the mixer in tasks 252 and 274 (approximately 0.5:1 in the exemplary embodiment) may also vary widely (e.g. from 0.25:1 to 0.75:1) without departing from the spirit of the present invention.

In a task 276 of process 230, the mixer is adjusted from the fourth mixing speed to a fifth mixing speed greater than the fourth mixing speed. Task 276 is coincident with task 274. That is, at the beginning of task 274, the mixer is set to the fourth mixing speed. Throughout task 274, task 276 slowly adjusts the mixer from the fourth mixing speed to the fifth mixing speed. At the end of task 274, the mixer is set to the fifth mixing speed.

Because tasks 274 and 276 are performed substantially simultaneously, tasks 274 and 276 together form a hypertask 278.

In the exemplary embodiment, the fifth mixing speed is substantially identical to the third mixing speed, and is a "medium-high" speed of approximately 1200 rpm. This medium-high mixing speed serves to generate a vortex, which more thoroughly mixes the contents of the mixer. Those skilled in the art will appreciate that a fifth mixing speed of 1200 rpm is not a requirement, and that another mixing speed may be used without departing from the spirit of the present invention.

In a task 280 of process 230, defoamer 144 (discussed hereinbefore in conjunction with task 244) is again added to the mixer while the mixer is operating at the fifth mixing speed.

In the exemplary embodiment, task 280 adds a second quantity of defoamer 144 to the mixer, where this second quantity constitutes approximately 0.49 percent of the mass of sealant coating 104. Those skilled in the art will appreciate that variations in formulation may allow the percentage of defoamer 144 in this second quantity to vary (e.g., from 0.24 to 0.74 percent of the mass of sealant coating 104) without departing from the spirit of the present invention.

Defoamer 144 is added to the mixer in tasks 244 and 280. In the exemplary embodiment, therefore, the first and second quantities of defoamer 144 collectively constitute approximately 1.45 percent of the mass of sealant coating 104. Those skilled in the art will appreciate that variations in formulation may allow the total percentage of defoamer 144 to vary (e.g., from 0.7 to 2.2 percent of the mass of sealant coating 104) without departing from the spirit of the present invention.

Additionally, it will be appreciated that the ratio of defoamer 144 added to the mixer in tasks 244 and 280 (approximately 1.96:1 in the exemplary embodiment may also vary widely (e.g. from 0.98:1 to 2.94:1) without departing from the spirit of the present invention.

In a task 282 of process 230, the contents of the mixer are mixed to produce finished sealant coating 104. This results in a waterproof, flexible, and breathable sealant coating 104 suitable for use with stucco.

It may be noted that the percentile sum of the ingredients of sealant coating 104 exceeds 100.00 percent. That is, the total mass of finished sealant coating 104 is 100.18 percent of the mass of sealant coating 104. This false overage occurs because approximately 0.18 percent of the mass of sealant coating 104 is lost during formulation process 230 due to the evaporation of volatiles.

The following discussion refers to FIG. 1.

With the completion of preconditioner formulation process 210 and sealant coating formulation process 230, stucco protection system. 100 is ready to be applied to the stucco.

In a task 290 of stucco protection process 200, preconditioner 102 is applied to new stucco to be protected.

It is a characteristic of preconditioner 102 that siliconate solution 120 penetrates and bonds with the cementitious components of the stucco. Preconditioner 102 thereby forms a breathable water-resistant shield. This shield inhibits the absorption of water from rain, sprinklers, etc., while simultaneously allowing the outgassing of entrapped moisture. This in turn inhibits efflorescence and cracking or chipping due to freeze out.

Previously painted stucco contains polymeric compounds derived from the previously applied paint. These polymeric compounds inhibit the ability of siliconate solution 120 to penetrate and bond with the cementitious component of the stucco. Therefore, task 290 may be omitted when previously painted stucco is to be protected.

In a task 292 of process 200, sealant coating 104 is applied to new stucco to be protected after the application of preconditioner 102 in task 290. Sufficient time is allowed between tasks 290 and 292 for preconditioner 102 to dry and cure. If the stucco was previously painted, then task 292 applies sealant coating 104 directly to a dry, clean, previously painted stucco.

Sealant coating 104 is configured to seal (i.e., caulk) cracks and voids in the stucco. In addition, sealant coating provides a tough, water-resistant coating which significantly lengthens the life of the stucco by inhibiting damage due to weather, thermal and mechanical stresses, and biological invasion.

Sealant coating 104 desirably has an opaque, bright white color. This allows sealant coating to be used as a color base. That is, a liquid pigment may be added to sealant coating 104 to produce any desired color (i.e., as pigment is added to a base paint). This allows sealant coating 104 to simultaneously serve as a correctly colored undercoat for paint 106.

In a task 294 of process 200, paint 106 is applied to the stucco to be protected after the application of sealant coating 104 in task 292. Sufficient time is allowed between tasks 292 and 294 for sealant coating 104 to dry. As stated hereinbefore, paint 106 is desirably a high-quality water-repellent exterior acrylic flat. Paint 106 is the final coat for the stucco, and should be colored accordingly.

Sealant coating 104 of stucco protection system 100 serves as a unique filler formulated specifically to protect and repair stucco more uniformly and more easily than caulking and painting or repainting. Ceramic and polymeric microspheres 152 and 160 function as highly effective, inert, substantially 100-percent stable fillers, and contribute to extremely high volume solids in sealant coating 104 without significantly adding weight. This results in a minimization of film shrinkage as sealant coating 104 cures. Hairline cracks and/or voids in the stucco are thereby effectively filled, and the entire stucco surface is effectively coated and rendered water-resistant. Paint 106 goes on stucco treated with sealant coating 104 smoothly and produces a uniform, crack-free appearance.

In summary, the present invention teaches a sealant coating 104, system 100 and process 200 for the protection of stucco. System 100 is made up of a water-resistant and breathable preconditioner 102, a waterproof and breathable sealant coating 104, and a readily available polymeric paint 106.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A coated stucco system, said system comprising:
    a substantially waterproof and breathable polymeric sealant coating comprising hollow microspheres and applied over said stucco; and
    a water-resistant acrylic paint applied over said stucco after application of said sealant coating.

2. A system as claimed in claim 1 additionally comprising a water-repellent preconditioner applied over said stucco before application of said sealant coating.

3. A system as claimed in claim 2 wherein said preconditioner comprises:
    water;
    an acrylic primer; and
    a water-repellent siliconate solution configured to bond with cement within said stucco.

4. A system as claimed in claim 3 wherein said siliconate solution is an aqueous sodium methyl siliconate solution.

5. A system as claimed in claim 1 wherein:
    said sealant coating additionally comprises:
        water;
        a polyol comprising diethylene glycol;
        a dispersant;
        a surfactant;
        a defoamer;
        a cellulosic thickener;
        a pH adjuster comprising monoethanolamine;
        a white hiding pigment comprising titanium dioxide;
        an antimicrobial preservative comprising dimethyloldimethyldantoin;
        a resin binder comprising an aqueous copolymer emulsion; and
    said microspheres comprise:
        ceramic microspheres comprising a multiplicity of hollow ceramic shells having diameters of 120–150 $\mu$m; and
        polymeric microspheres comprising a multiplicity of hollow polymeric shells having diameters of 20–60 $\mu$m.

6. A system as claimed in claim 1 wherein said sealant coating comprises:
    a polyol;
    an ester alcohol;
    a defoamer;
    a pigment;
    a polysiloxane emulsion;
    a dispersant;
    a surfactant;
    a pH adjuster;
    a preservative; and
    a thickener.

7. A system as claimed in claim 6 wherein said polyol comprises diethylene glycol.

8. A system as claimed in claim 6 wherein said pigment comprises a white hiding pigment.

9. A system as claimed in claim 8 wherein said white hiding pigment comprises titanium dioxide.

10. A system as claimed in claim 6 wherein said pH adjuster comprises monoethanolamine.

11. A system as claimed in claim 6 wherein said antimicrobial preservative comprises dimethyloldimethyldantoin.

12. A system as claimed in claim 6 wherein said thickener comprises a cellulosic thickener.

13. A system as claimed in claim 1 wherein:
    said sealant coating additionally comprises:
        water; and
        a resin binder; and said microspheres comprise:
  ceramic microspheres; and
  polymeric microspheres.

14. A system as claimed in claim 13 wherein said ceramic microspheres comprise a multiplicity of hollow ceramic shells having diameters of at least 100 μm.

15. A system as claimed in claim 14 wherein said hollow ceramic shells have diameters of 120–150 μm.

16. A system as claimed in claim 13 wherein said polymeric microspheres comprise a multiplicity of hollow polymeric shells having diameters of 25–60 μm.

17. A system as claimed in claim 16 wherein each of said hollow polymeric shells is formed of vinylidene chloride and acrylonitrile.

18. A system as claimed in claim 13 wherein said resin binder comprises an aqueous copolymer emulsion.

19. A system as claimed in claim 18 wherein said aqueous copolymer emulsion comprises:
  styrene monomers; and
  acrylic monomers.

* * * * *